G. SAVINO.
VALVE.
APPLICATION FILED OCT. 24, 1911.
1,049,153.
Patented Dec. 31, 1912.
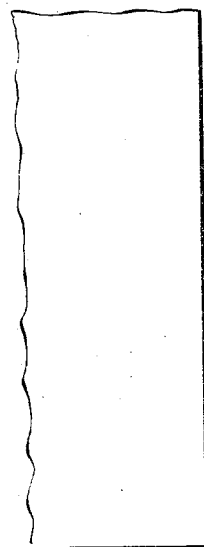
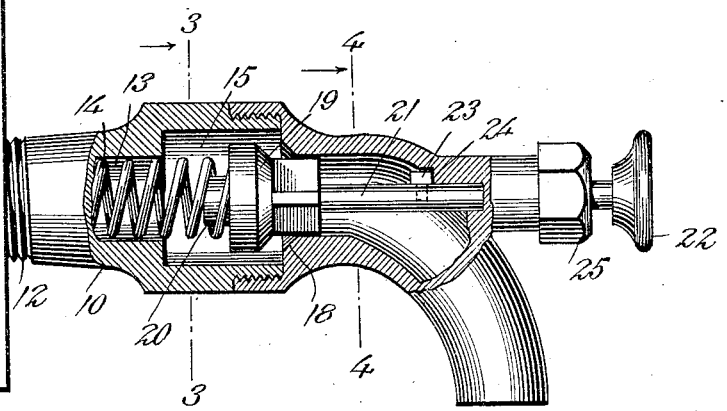
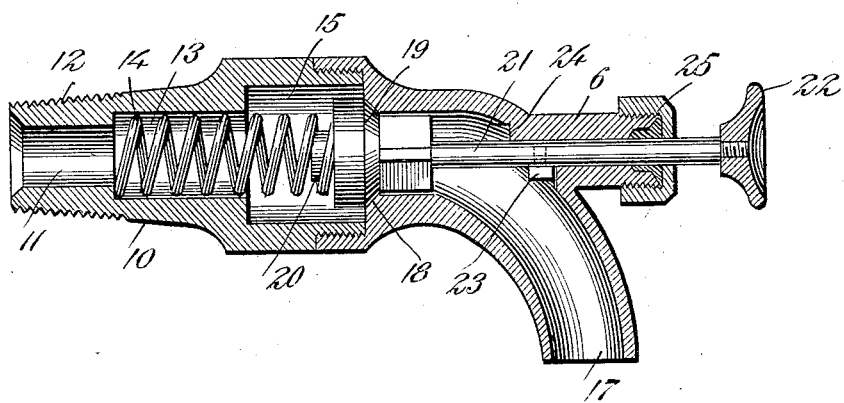
Inventor
Guy Savino
By Victor J. Evans
Attorney
Witnesses

UNITED STATES PATENT OFFICE.

GUY SAVINO, OF SCRANTON, PENNSYLVANIA.

VALVE.

1,049,153.  Specification of Letters Patent.  Patented Dec. 31, 1912.

Application filed October 24, 1911. Serial No. 656,423.

*To all whom it may concern:*

Be it known that I, GUY SAVINO, a citizen of the United States, residing at Scranton, in the county of Lackawanna and State of Pennsylvania, have invented new and useful Improvements in Valves, of which the following is a specification.

The invention relates to valves and has for an object to provide a self-closing valve, normally retained in closed position by the action of a fluid and manually operative to be releasably retained in open position.

My invention embodies among other features a valve for connection with a liquid supply and in which the force of the liquid will normally retain the valve in closed position, while at the same time the valve can be manually operated and moved into open position, means being provided for locking the valve in open position relatively to the casing thereof.

For the purpose mentioned, use is made of a casing provided with an inlet and adapted for connection with a liquid supply, a cover for engagement with the said casing and provided with an outlet, a valve seat formed on the said cover, a valve mounted within the said casing and adapted to normally repose on the said valve seat, a shank slidably mounted in the said cover, the said shank having one end thereof secured to the said valve and the other end thereof extending exteriorly of the said cover and terminating in a handle, a locking pin mounted on the said shank and adapted to engage a shoulder in the said cover to retain the valve in open position and a spring mounted in the casing and engaging the said valve to normally retain the valve in closed position.

Reference is to be had to the accompanying drawings constituting a part of this specification, in which similar characters of reference denote corresponding parts in all the views, and in which—

Figure 1 is a side elevation of my device, parts being broken away to disclose the underlying structure, the valve being in open position. Fig. 2 is a vertical longitudinal sectional view of my invention, the valve being shown in closed position.

Referring more particularly to the views, I provide a tubular casing 10 having an inlet 11 and a threaded portion 12 adapted for connection with a tank or the like, a chamber 13 being provided in the casing 10 and adapted to act as a seat for an expansible spring 14 and a second chamber 15 being provided in the casing 10 and adapted to constitute a liquid receiving chamber as will be hereinafter more fully disclosed.

A cover 16 is adapted for threaded connection with the casing 10 and is provided with an outlet 17, a beveled seat 18 being formed on the cover 16 adjacent that portion of the cover which is threadedly engaged with the casing 10 so that the seat 18 will be positioned adjacent the liquid chamber 15 as shown particularly in Fig. 2. A beveled valve 19 provided with a shank 20, is adapted to repose on the seat 18, the mentioned valve 19 being movable within the chamber 15 and the shank 20 of the valve 19 being encircled by an end of the expansible spring 14, the other end of which is mounted within the chamber 13 as has been heretofore mentioned. Thus the spring 14 will normally tend to retain the valve 19 in engagement with the valve seat 18.

A valve stem 21 is secured to the valve 19 and slidably extends through the cover 16 with an end of the valve stem projecting exteriorly of the cover and provided with a handle 22. A locking pin 23 is threadedly connected with the valve stem 21 and is adapted to abut against an outer shoulder 23$^a$ formed in the inner side of the cover 16 when the valve 19 reposes on the valve seat 18, an inner shoulder 24 being formed on the inner side of the cover 16 in spaced relation to the shoulder 23$^a$ and adapted to receive the locking pin 23 to retain the valve 19 in open position as will be hereinafter more fully disclosed, the cover member 16 being further provided with a continuous bearing surface 24$^b$ extending from one shoulder to the other. A suitable stuffing box 25 is mounted on the cover 16 at the place where the valve stem 21 extends exteriorly of the cover, thus preventing any leakage of fluid from the cover 16 through the opening in the cover, having the valve stem projecting therethrough.

Now assuming that the device described is connected to a liquid supply by engaging the threaded portion 12 with a tank or the like, the action of the liquid flowing into the chamber 15, combined with the action of the spring 14 will normally retain the valve 19 in engagement with the valve seat 18. When it is desired to withdraw a certain quantity of liquid from the tank, an inward pressure is exerted on the handle 22 thus moving the valve 19 against the action of the spring 14 and the liquid in the chamber 15, the said valve being disengaged from the valve seat 18, thus permitting the liquid in the chamber 15 and the tank to flow outwardly through the outlet 17 as will be readily understood. When the pressure on the handle 22 is released the action of the liquid in the chamber 15 and the spring 14 will return the valve 19 to normal position thus closing the opening to the cover 16 and preventing the outflow of the liquid in the tank. When it is desired to withdraw a large amount of liquid from the tank, the handle 22 is grasped and by pressing inwardly on the handle and turning the same, the valve 19 will be disengaged from the valve seat 18 and the locking pin 23 will engage the shoulder 24, thus retaining the valve 19 in open position and locking the same against the action of the spring 14 and the liquid in the tank, thus permitting the liquid in the tank to freely flow outwardly through the outlet 17. When a sufficient amount of liquid has been withdrawn from the tank, the handle 22 is simply turned to disengage the locking pin 23 from the shoulder 24 and the combined action of the spring 14 and the remaining liquid in the tank will force the valve 19 into closed position and into engagement with the valve seat 18.

From the foregoing description, it will be seen that a device is provided, in which the outflow of liquid from the tank can be easily and quickly controlled at all times and in which either a large or small amount of liquid can be withdrawn from the tank without necessitating a continued inward pressure on the handle 22.

Having thus fully described the invention, what I claim as new, is:—

In a valve, the combination of a tubular casing comprising an inlet member, and an outlet member detachably secured to the inlet member, said outlet member provided with a valve seat, and having a valve stem opening in alinement with the said seat, a valve stem mounted within said opening for slidable and rotary movement, a valve plug secured to the inner end of said stem and adapted to seat so as to close communication through the casing upon outward movement thereof, means for normally maintaining said valve in closed position, the outlet member being curved downwardly and provided adjacent the lower edge of the valve stem opening with a vertical shoulder, said member having a second vertical shoulder provided at the upper edge of the said opening and spaced inwardly with respect to the first shoulder, said member having also a continuous stem-bearing surface extending from one shoulder to the other, and a locking pin projecting laterally from said valve stem and adapted to engage the innermost shoulder to lock the valve in open position and to engage the outermost shoulder when in closed position.

In testimony whereof I affix my signature in presence of two witnesses.

GUY SAVINO.

Witnesses:
C. S. WOODRUFF,
WM. VANDERVORT.

---

Copies of this patent may be obtained for five cents each, by addressing the "Commissioner of Patents. Washington, D. C."